(12) United States Patent
Hosokawa

(10) Patent No.: US 8,225,064 B2
(45) Date of Patent: Jul. 17, 2012

(54) STORAGE REGION ALLOCATION SYSTEM, STORAGE REGION ALLOCATION METHOD, AND CONTROL APPARATUS

(75) Inventor: Kouhei Hosokawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1066 days.

(21) Appl. No.: 12/097,707

(22) PCT Filed: Dec. 6, 2006

(86) PCT No.: PCT/JP2006/324330
§ 371 (c)(1), (2), (4) Date: Jun. 16, 2008

(87) PCT Pub. No.: WO2007/069506
PCT Pub. Date: Jun. 21, 2007

(65) Prior Publication Data
US 2010/0005233 A1    Jan. 7, 2010

(30) Foreign Application Priority Data
Dec. 16, 2005    (JP) .................................. 2005-363241

(51) Int. Cl.
*G06F 12/00* (2006.01)
*G06F 12/02* (2006.01)

(52) U.S. Cl. .. 711/170; 711/105; 711/154; 711/E12.001

(58) Field of Classification Search ........................ None
See application file for complete search history.

(56) References Cited

U.S. PATENT DOCUMENTS

| | | | |
|---|---|---|---|
| 4,613,953 A * | 9/1986 | Bush et al. ........................ 711/2 |
| 5,301,292 A | 4/1994 | Hilton et al. |
| 5,572,692 A | 11/1996 | Murdoch et al. |
| 5,638,534 A * | 6/1997 | Mote, Jr. ........................ 711/158 |
| 5,668,974 A | 9/1997 | Grassi et al. |
| 6,145,063 A | 11/2000 | Ueno et al. |
| 6,560,686 B1 * | 5/2003 | Nishida ........................ 711/173 |
| 2002/0060940 A1* | 5/2002 | Tomita ........................ 365/222 |
| 2003/0074519 A1 | 4/2003 | Weber |
| 2003/0182477 A1* | 9/2003 | Fukawa et al. .................. 710/22 |

FOREIGN PATENT DOCUMENTS

| | | |
|---|---|---|
| EP | 0 629 952 | 12/1994 |
| JP | 11-161544 | 6/1999 |
| JP | 2001-175530 | 6/2001 |
| JP | 2005-508550 | 3/2005 |
| WO | 96/13774 | 5/1996 |
| WO | 96/37050 | 11/1996 |
| WO | 96/39664 | 12/1996 |

OTHER PUBLICATIONS

European Search Report—EP 06 83 4085—Aug. 10, 2010.

* cited by examiner

Primary Examiner — Michael Krofcheck
(74) Attorney, Agent, or Firm — Young & Thompson

(57) ABSTRACT

There are provided a memory space allocation method and a memory space allocation device that aim at higher-speed accesses when a memory is shared by a plurality of circuits. In this memory, one data is accessed by issuing addresses a plurality of times. Memory allocation is performed so that high-order addresses of memory spaces of an external memory 505 may be maximally shared by a plurality of circuits 501. When the high-order addresses are common, a memory control circuit does not transfer the high-order addresses, thereby reducing the number of transfers of the high-order addresses. Therefore, the higher-speed access is achieved.

23 Claims, 17 Drawing Sheets

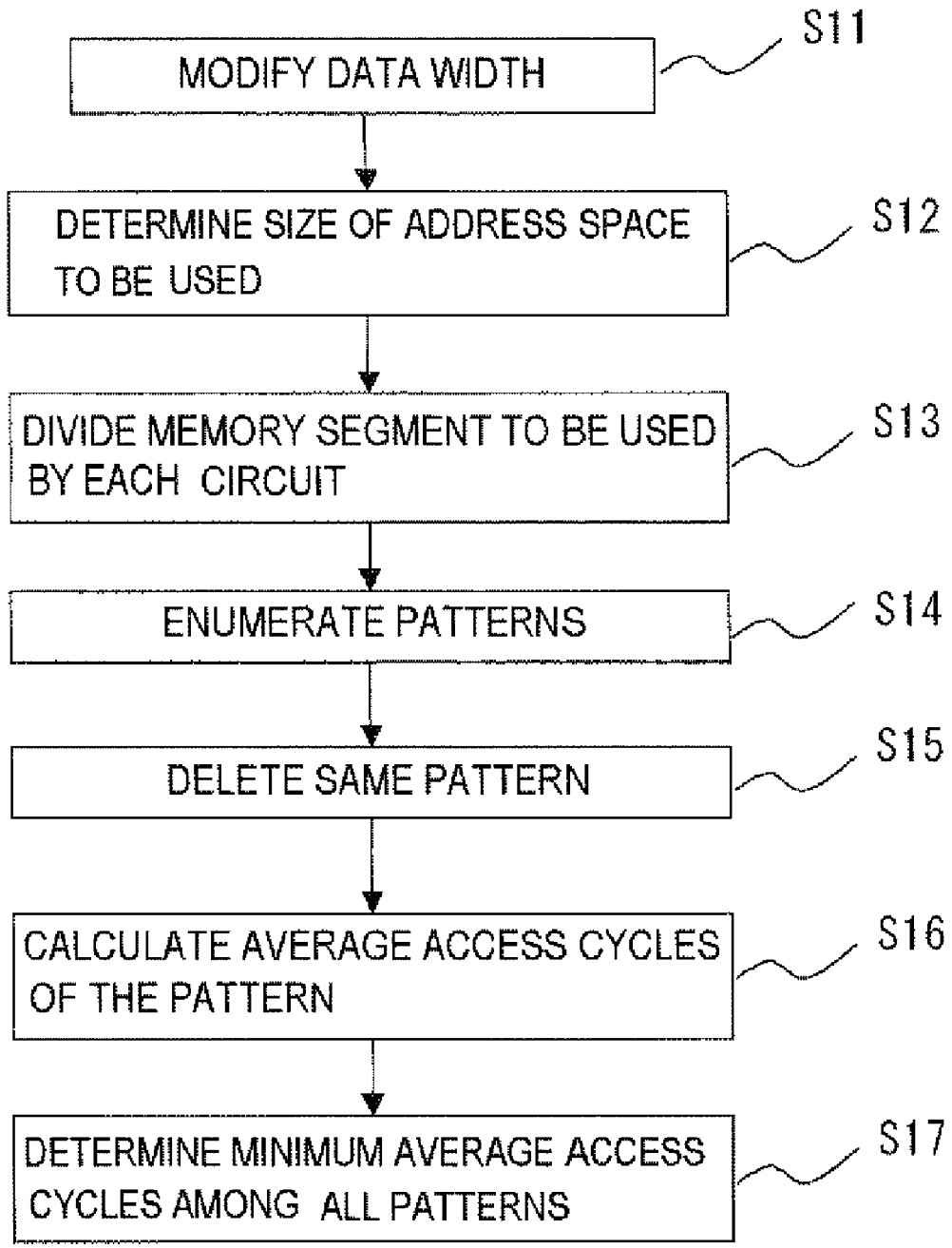

FIG. 8A  FIG. 8B  FIG. 8C  FIG. 8D
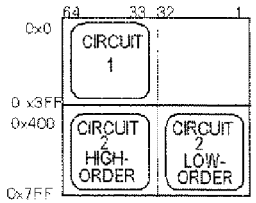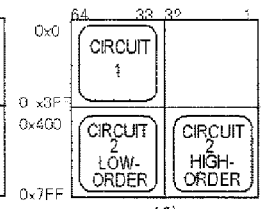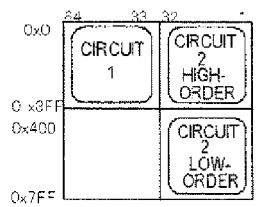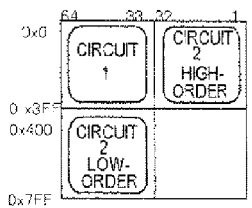
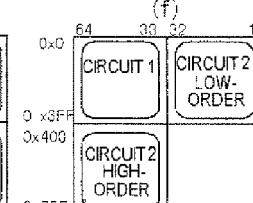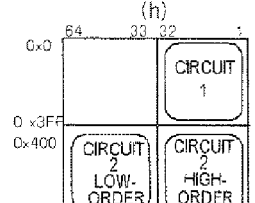
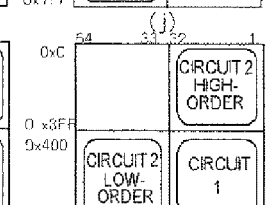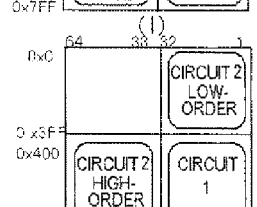
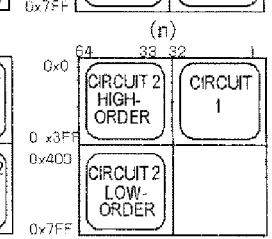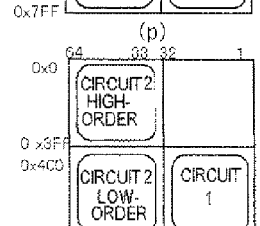
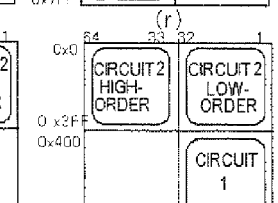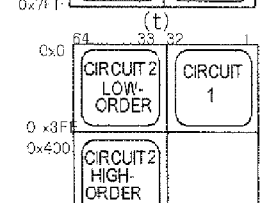
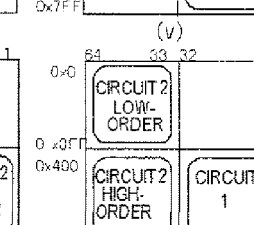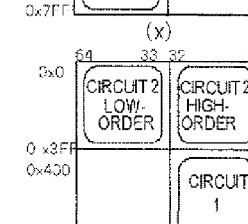

[PATTERN 1]

[PATTERN 2]

[PATTERN 3]

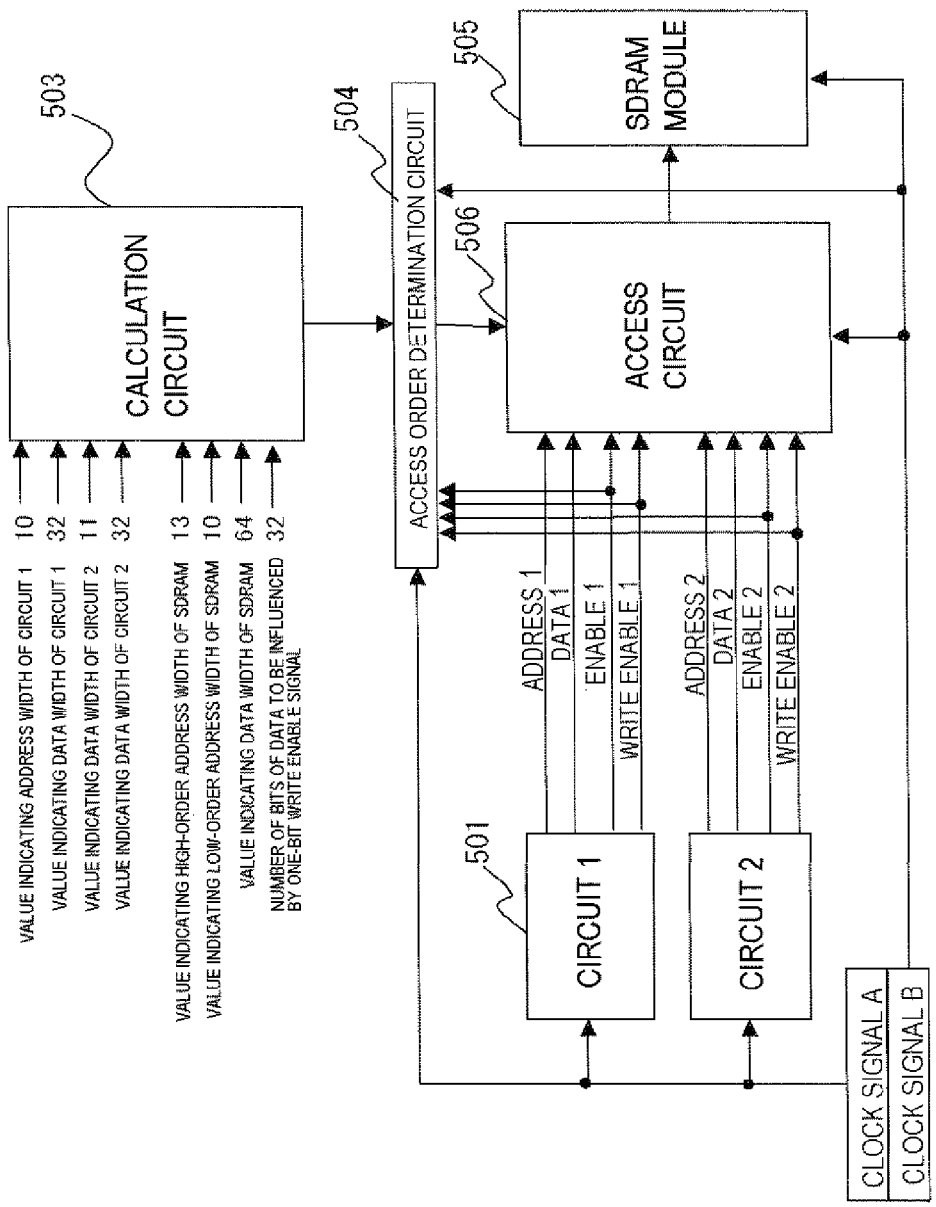

FIG.17

| PATTERN | ACCESS TO CIRCUIT 1 | ACCESS TO HIGH-ORDER SIDE OF CIRCUIT 2 | ACCESS TO LOW-ORDER SIDE OF CIRCUIT 2 | NECESSARY NUMBER OF CYCLES (OF PATTERN 1) | NECESSARY NUMBER OF CYCLES (OF PATTERN 2) |
|---|---|---|---|---|---|
| (1) | NOT PRESENT | NOT PRESENT | NOT PRESENT | 0 | 0 |
| (2) | PRESENT | NOT PRESENT | NOT PRESENT | 8 | 8 |
| (3) | NOT PRESENT | PRESENT | NOT PRESENT | 8 | 8 |
| (4) | NOT PRESENT | NOT PRESENT | PRESENT | 8 | 8 |
| (5) | PRESENT | PRESENT | NOT PRESENT | 16 | 16 |
| (6) | PRESENT | NOT PRESENT | PRESENT | 16 | 8 |

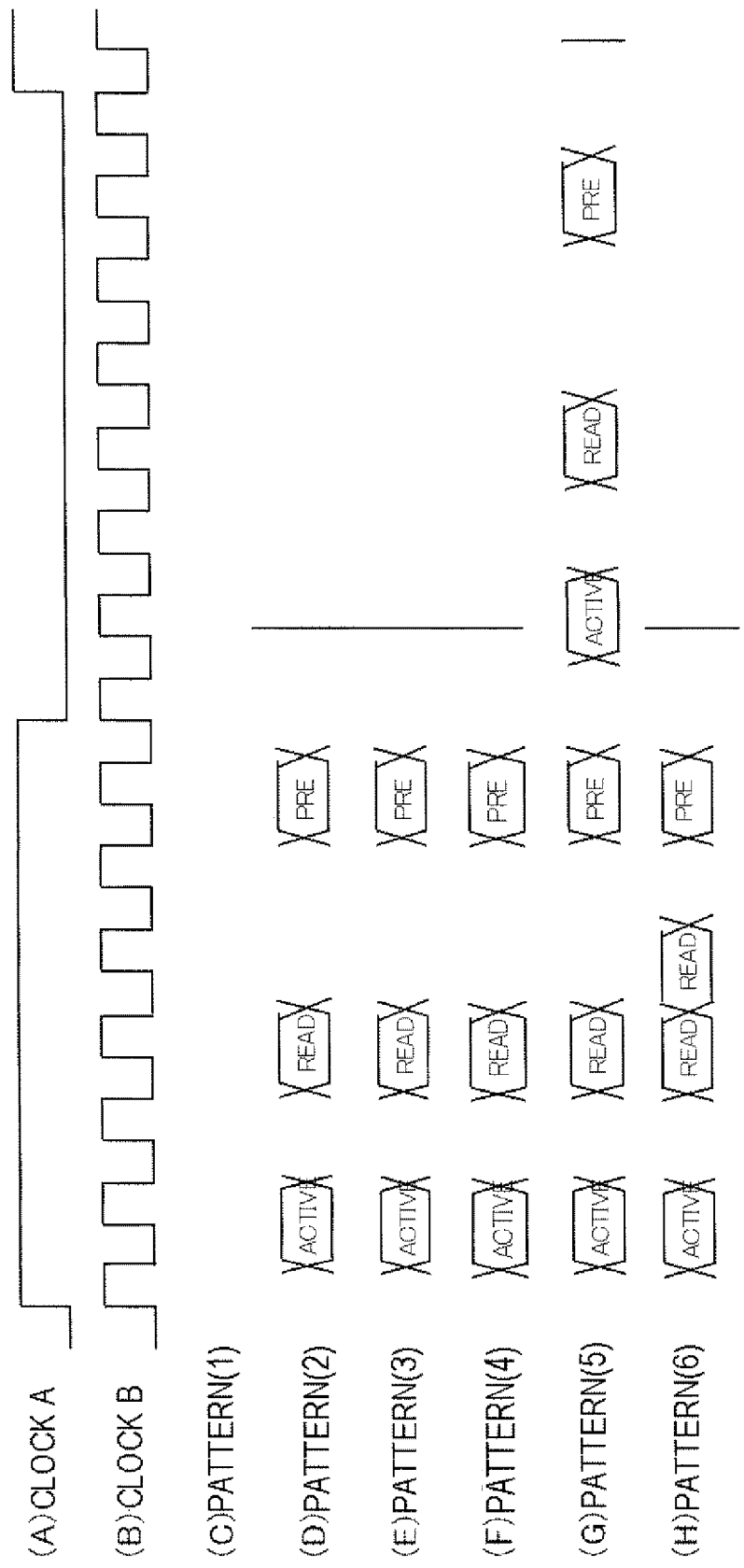

STORAGE REGION ALLOCATION SYSTEM, STORAGE REGION ALLOCATION METHOD, AND CONTROL APPARATUS

TECHNICAL FIELD

The present invention relates to memory control. More specifically, the invention relates to a memory region allocation system, a memory region allocation method, a control apparatus, and a computer program, for sharing one memory by a plurality of circuits, for use.

BACKGROUND ART

An increasing number of LSIs in recent years, such as those in multimedia systems and operating systems, need much memory (large-capacity memory) for processing. However, the capacity of the memory capable of being mounted on-chip on an LSI is often smaller than a required memory capacity. In such a case, a dedicated memory LSI is connected to the outside of the LSI for performing a desired process. In such a configuration, accesses to the external memory LSI are sometimes made from a plurality of circuits. In a memory control circuit, for example, arbitration control of accesses from a plurality of circuits is performed. Further, in recent years, a clock synchronous type dynamic random access memory (a synchronous DRAM, which is abbreviated as "SDRAM") has been in wide spread use.

FIG. 1 is a timing chart for explaining a read access to the SDRAM. In the read access, an ACTIVE command, which provides a row (ROW) address of the data to be accessed, is first issued. Next, a READ command, which provides a column (COLUMN) address of the data to be accessed, is issued. After a predetermined delay (a latency), read data D1 is read out from a data terminal DQ. Referring to FIG. 1, a NOP command indicates a state where no command is issued, and a PRE command is a command that instructs precharging of a bit line. FIG. 1 shows operation timings for the read access. On the other hand, a ROW address is provided by using the ACTIVE command and a COLUMN address is provided by using a WRITE command in the case of a write access.

In the memory control circuit that controls accesses from the circuits operated with a same clock, the simplest approach to process the accesses utilizes time-division multiplexing of the accesses.

Time-division multiplexing of accesses will be described below to use an example which comprise a circuit A 201 and a circuit B 202 connected to a memory control circuit 203 to share an SDRAM 204, as shown in FIG. 2.

FIG. 3 is a timing chart, when both circuits A 201 and B 202 issues read commands at the same time, to explain how the memory control circuit 203 processes these commands. The memory control circuit 203 first processes the read access from the circuit A 201 (operation timings of the read access is the same as those in FIG. 1). Next, the memory control circuit 203 processes the read access from the circuit B 202 (operation timings of the read access is the same as those in FIG. 1).

Though time-division multiplexing of the accesses is extremely simple as described above, an access time corresponding to the number of the circuits connected to the memory control circuit 203 is required.

As another approach to process accesses from a plurality of circuits, an interleaving method is also employed. In the interleaving method, a structure capable of controlling respective banks independently is presupposed. In the interleaving method, a memory space to be used by each of the circuits is assigned to each bank capable of being independently controlled. The memory space to be used by the circuit A 201, for example, is assigned to a bank 1, while the memory space to be used by the circuit B 202 is assigned to a bank 2.

FIG. 4 is a timing chart to illustrate the access example from the memory control circuit 203 using the interleaving method. As shown in FIG. 4, by overlapping the respective accesses in the interleaving method, overall processing is sped up. Referring to FIG. 4, following the ACTIVE, NOP, and READ commands for a read access from the circuit A, the ACTIVE, NOP, and READ commands are issued for a read access from the circuit B. During a cycle of the NOP command in the read access from the circuit B, read data D1 corresponding to the read access from the circuit A is read out from a DQ terminal. Then, two cycles later than this cycle, read data D2 corresponding to the read access from the circuit B is read out from the DQ terminal.

Referring to FIG. 3, 14 cycles are spent for the read accesses from the circuits A and B. Referring to FIG. 4, the number of cycles for the read accesses from the circuits A and B is shortened to 10 cycles. It can be seen that the speed of the processing the overall accesses is increased to 1.4 times.

A configuration in which, when accesses from a plurality of circuits are managed by one memory, memory spaces to be accessed by the respective circuits are arranged at different addresses, has been also wide-spread use.

DISCLOSURE OF THE INVENTION

Problem To Be Solved By the Invention

In the conventional memory system, in order to facilitate memory management, memory spaces to be used by different circuits are arranged at different addresses, and a faster operation which utilizes a memory used by each of the circuits at the same address is not implemented.

For every access, the ACTIVE command, READ/WRITE command, and PRECHARGE command are executed. This is because several types of data occupy all the memory spaces, and unless the access is made this manner or unless the ACTIVE command is used, desired data cannot be accessed.

Accordingly, an object of the present invention is to provide a system, a device, and a method which, when memory to be used by each of a plurality of circuits is allocated to a memory space in one external memory, the number of necessary cycles is minimized, and high-order addresses are optimized and arranged so that the number of transfers of from high-order address to the external memory is restrained and reduced.

Means For Solution To the Problem

The invention disclosed in the present application is generally configured as follows in order to solve the problem described above.

A system according to one aspect (aspect) of the present invention includes:

one or a plurality of access generation means, the one or a plurality of access generation means generating at least two types of accesses in total;

access means for processing the accesses from the one or a plurality of access means;

storage means connected to the access means, at least two or more address specifying information being communicated so as to specify one address in the storage means, the storage means being configured so that communication of the address specifying information that is equal to the address specifying information communicated at a preceding time may be omitted; and calculation means for determining an occupation region in the storage means to be used by each of the one or a plurality of access generation means so as to minimize the average access number to the storage means, based on an address width and a data width of a communication path between each of the one or a plurality of access generation means and the access means and widths of the address specifying information and a data width of the storage means.

In the present invention, the calculation means may exhaustively enumerate allocation patterns of the storage means for the plurality of access generation means; and the calculation means may calculate the average access number for each of the enumerated patterns, and determines the occupation region in the storage means with the average access number being minimum among these average access numbers.

In the present invention, the calculation means may receive a second data width to be influenced by a one-bit write enable; and rounding up to an integer the quotient when the data width of each of the one or a plurality of access generation means is divided by the second data width and further multiplying the integer by the second data width, and using a resulting value as the data width of each of the one or a plurality of access generation means, the calculation means may determine the occupation region in the storage means.

In the present invention, the calculation means may determine the occupation region of each of the one or a plurality of access generation means in the storage means, using a region obtained by dividing the occupation region to be occupied by each of the one or a plurality of access generation means by one of the address specifying information and the second data width.

A control apparatus according to the present invention may include:

input means for transmitting to the calculation means the address width and the data width of the communication path between each of the one or a plurality of access means and the access means and the widths of the address specifying information of the storage means and the data width of the storage means; and access order determination means for determining an access order so as to minimize the average access number based on occupation region allocation determined by the calculation means and an access status of each of the one or a plurality of access generation means. The access means may control the storage means in accordance with the access order determined by the access order determination means.

A control apparatus according to the present invention may include:

input means for transmitting to the calculation means the address width and the data width of the communication path between each of the one or a plurality of access means and the access means, the widths of the address specifying information of the storage means and the data width of the storage means, and the data width to be influenced by the one-bit write enable; and access order determination means for determining an access order so as to minimize the average access number based on occupation region allocation determined by the calculation means and an access status of each of the one or a plurality of access generation means. The access means may control the accesses to the storage means in accordance with the access order determined by the access order determination means.

In the present invention, the storage means may be a clock synchronous type dynamic random access memory; and when the accesses are made to memory spaces arranged at a same row address and to be used by the one or a plurality of access generation means, the access order determination means may sequentially issue an active command one time, a read command/write command a plurality of times, and a precharge command one time to perform processing.

In the present invention, when the accesses are made to memory arranged at a same row address and to be used by the one or a plurality of access generation means, the access order determination means may be configured so that one of write processing and read processing is brought together, and is processed earlier, and then a remainder of the processing is performed next.

A method according to other aspect of the present invention is a storage region allocation method of allocating an occupation region in storage means, one or a plurality of access generation means generating at least two types of accesses in total, the storage means being connected to access means for processing the accesses from the one or a plurality of access means, at least two or more address specifying information being communicated so as to specify one address in the storage means, and the storage means being so configured that communication of address specifying information that is equal to address specifying information communicated at a preceding time may be omitted. The storage region allocation method includes the steps of:

(a) receiving an address width and a data width of a communication path between each of the one or a plurality of access generation means and the access means;

(b) receiving widths of the address specifying information of the storage means and a data width of the storage means; and (c) determining the occupation region in the storage means to be used by the one or a plurality of access generation means so as to minimize the average access number, using the information obtained in the step (a) and the step (b).

In the method according to the present invention, the step (c) includes the steps of:

(c. 1) enumerating a plurality of patterns on occupation region allocation of the storage means to be used by the one or a plurality of access generation means;

(c. 2) calculating the average access number for each of the patterns obtained in the step (c. 1); and (c. 3) determining the pattern with the average access number being minimum among the average access numbers of the respective patterns obtained in the step (c. 2), as the occupation region in the storage means to be used by the one or a plurality of access generation means.

In the method according to the present invention, the step (a) includes the steps of:

(a. 1) receiving a second data width to be influenced by a one-bit write enable for the storage means; and (a. 2) dividing the data width of each of the one or a plurality of access generation means by the second data width and rounding up a resulting value of the division to an integer, further multiplying the integer by the second data width, and using a result of the multiplication as a modified data width of each of the one or a plurality of access generation means.

In the method according to the present invention, the step (c. 1) includes the steps of:

(c. 1.1) dividing the storage means into occupation regions to be respectively occupied by the one or a plurality of access generation means, using one of the address specifying information and the second data width; and (c. 1.2) enumerating the patterns of combinations of the divided occupation regions obtained in the step (c. 1.1) and allocation of each of the one or a plurality of access generation means.

A control apparatus according to the present invention is the device that controls accesses from a plurality of circuits to a sharing memory. The control apparatus includes:

calculation means for receiving information on an address width and a data width of each of the circuits, and information on a high-order address width, a low-order address width, and a data width of the memory, or the information and information on a data width to be influenced by a one-bit write enable for the memory, and determining memory allocation to be allocated to the circuits so as to reduce the number of cycles to be spent for processing the accesses from the circuits;

access order determination means for determining an access order for the memory, based on information on the accesses from the circuits and the memory allocation determined by the calculation means; and access means for accessing to the memory in accordance with the access order determined by the access order determination means.

In the present invention, each of the circuits issues to the memory address information a plurality of times, thereby accessing data. The memory is configured so that when an access is made to an address of the address information issued the plurality of times which is the same as an address accessed at a preceding time, transfer of the address may be omitted. In the present invention, the calculation means calculates such the memory allocation that minimizes the access number.

A computer program according to still other aspect of the present invention is the program that causes a computer configuring a control apparatus that controls accesses from a plurality of circuits to a sharing memory to execute:

calculation processing of receiving information on respective address widths and respective data widths of the circuits, a high-order address width, a low-order address width, and a data width of the memory, or the information and information on a data width to be influenced by a one-bit write enable for the memory, and determining memory allocation to be allocated for the circuits so as to reduce the number of cycles to be spent for processing the accesses from the circuit;

access order determination processing of determining an access order for the memory, based on information on the accesses from the circuits and the memory allocation determined by the calculation processing; and access processing of accessing to the memory in accordance with the access order determined by the access order determination processing.

Effects of the Invention

According to the present invention, accesses from a plurality of circuits that simultaneously occur can be sped up. The reason for the speeding up is that, in the present invention, the calculation means determines allocation of the external memory so that the number of necessary cycles is minimized, and further the access order determination means determines the access order so that transfer of high-order address is minimized.

In the SDRAM, for example, by optimizing allocation of memory spaces to be used by the respective circuits, the ACTIVE command and the PRECHARGE command can be efficiently omitted. The accesses can be thereby sped up.

Further, according to the present invention, the calculation means performs allocation with addresses put close to one another so that high-order addresses may be shared as much as possible. A usage rate of the external memory can be thereby increased.

BRIEF DESCRIPTION OF THE DRAWINGS

FIG. 7 is a flow diagram for explaining processing of calculation means in the exemplary embodiment of the present invention;

FIGS. 8A to 8D are diagrams showing all patterns enumerated by the calculation means in the exemplary embodiment of the present invention;

FIG. 16 is a diagram showing a configuration of an embodiment of the present invention;

FIG. 17 is a table showing the numbers of cycles of all access patterns for access means in the embodiment of the present invention; and FIG. 18 is a diagram showing waveforms of all the access patterns for the access means in the embodiment of the present invention.

DESCRIPTION OF REFERENCE NUMERALS

201, 202 circuit
203 memory control circuit
204 SDRAM
501 circuit
502 input means
503 calculation means (calculation circuit)
504 access order determination means (access order determination circuit)

505 external memory (SDRAM module)
506 access means (access circuit)
507 clock signal A
508 clock signal B
1401 program
1402 memory control means

PREFERRED MODE FOR CARRYING OUT THE INVENTION

Figure 1:
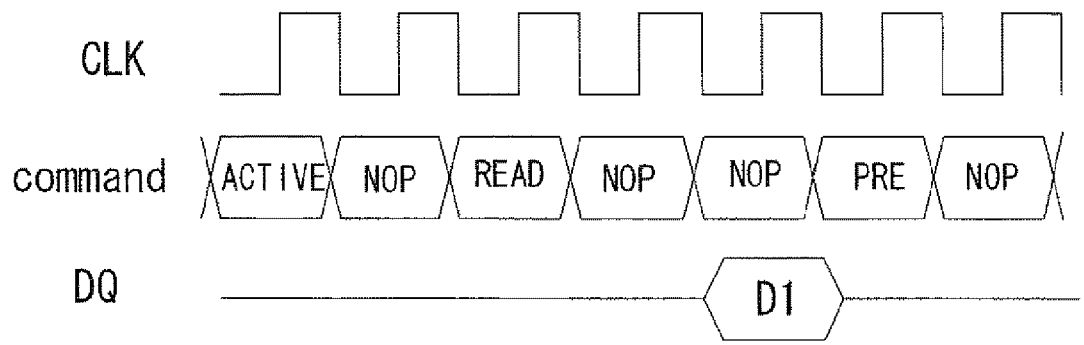
FIG. 1 is a waveform diagram showing basic operations on an SDRAM.
Figure 2:
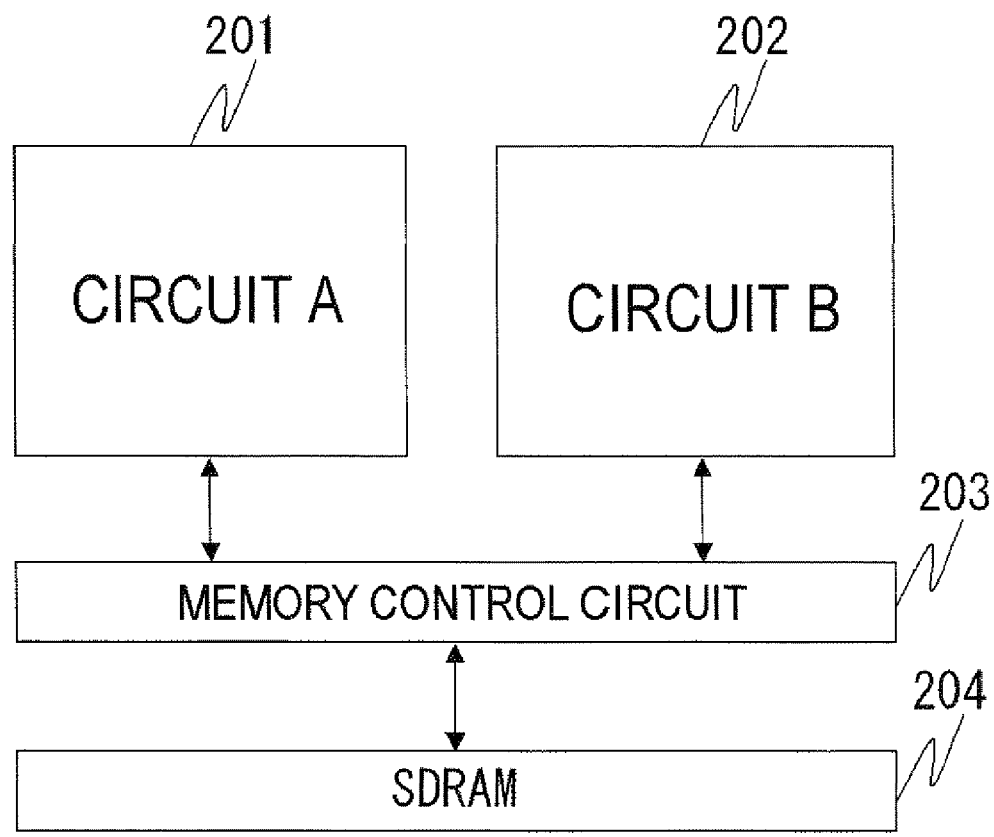
FIG. 2 is a block diagram for explaining a conventional approach.
Figure 3:
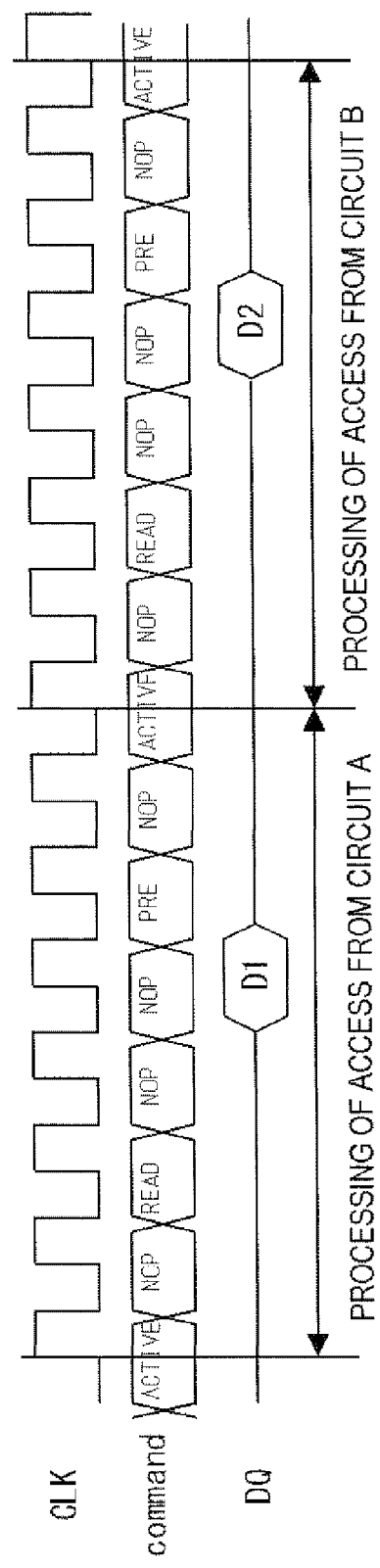
FIG. 3 is a waveform diagram showing a simplest conventional approach to time-division multiplexing of accesses.
Figure 4:
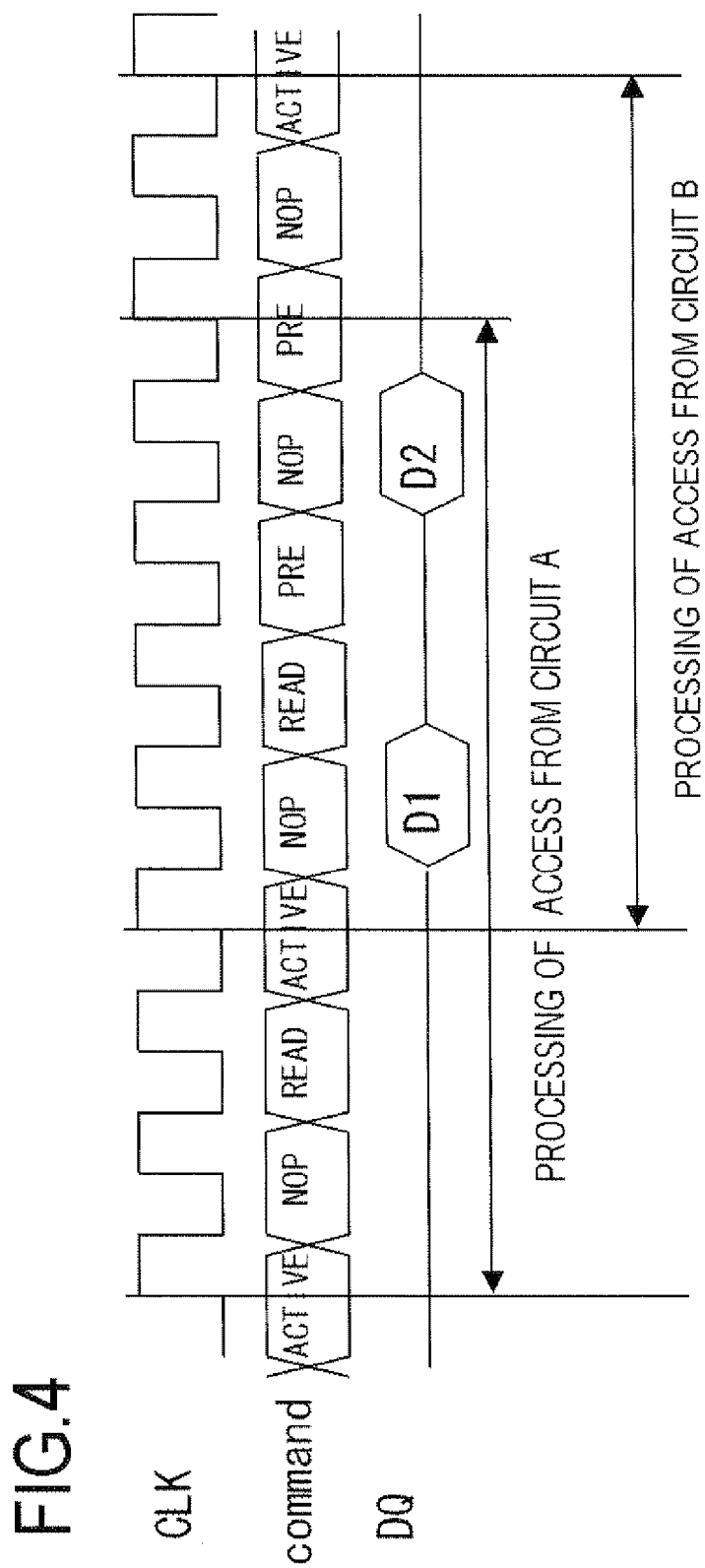
FIG. 4 is a waveform diagram showing access from a memory control circuit, using an interleaving method.
Figure 5:
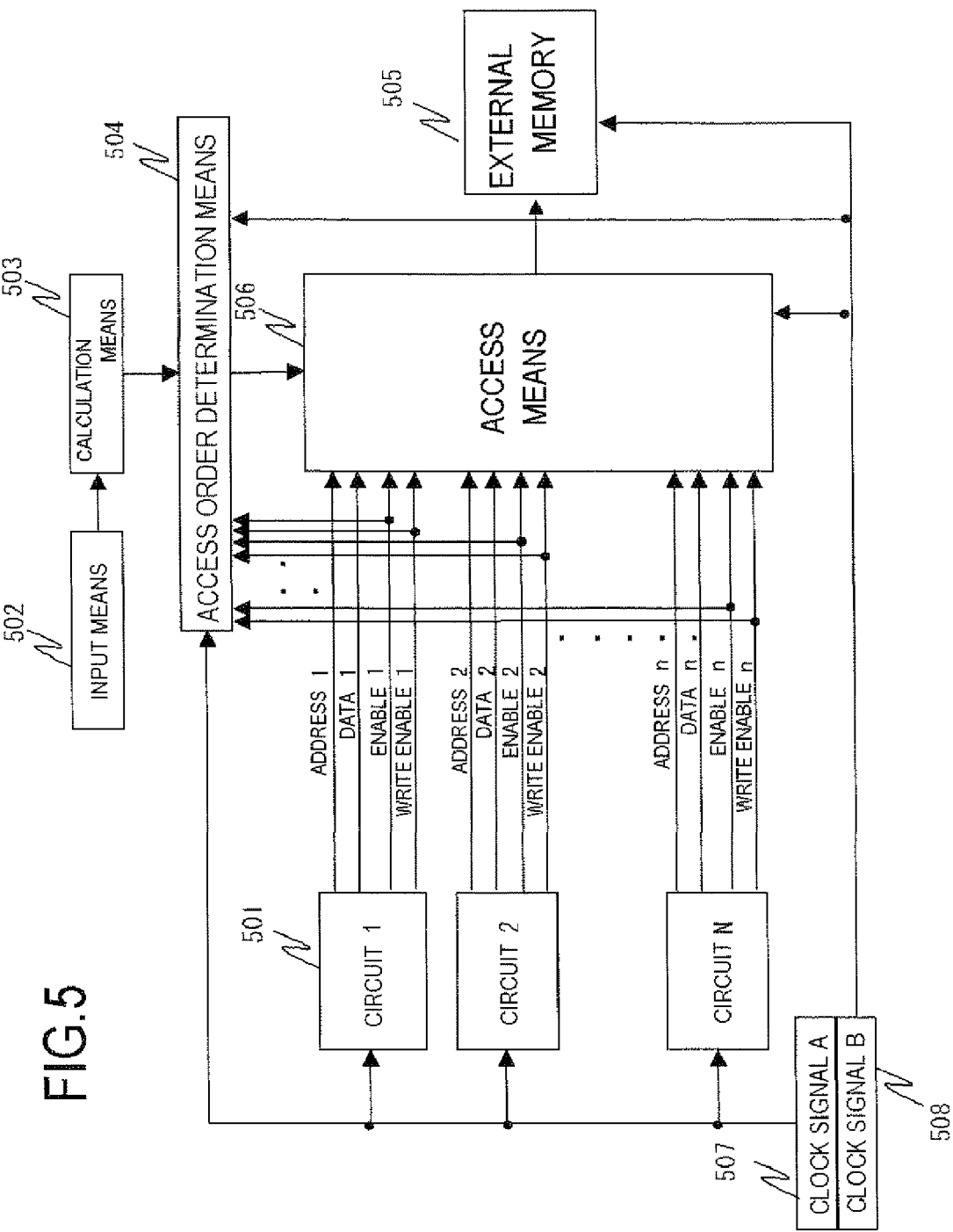
FIG. 5 is a diagram showing a configuration of an exemplary embodiment of the present invention.

In order to describe the present invention mentioned above in further detail, a description will be given with reference to appended drawings. Referring to FIG. 5, in the present invention, a memory (external memory) 505 is such a memory in which one items of data can be accessed by issuing address a plurality of times. The external memory 505 is effective when a data width of the external memory 505 is longer than a data width of each of the circuits.

In the present invention, there are provided input means 502, calculation means 503, access order determination means 504, access means 506, a clock signal A 507, and a clock signal B 508. The input means 502 is for transmitting to the calculation means 503 address widths and data widths needed by a plurality of circuits 501 (corresponding to access generating means of the present invention) that make accesses (read/write accesses) to a memory and a high-order address width, a low-order address width, and a data width of the external memory 505, and a data width to be influenced by a one-bit write enable. The calculation means 503 determines such memory allocation that minimizes the number of cycles necessary for processing all accesses, from respective information supplied by the input means 502. The access order determination means 504 determines an optimal access order based on access information from each circuit 501 and the memory allocation determined by the calculation means 503. The access means 506 accesses to the external memory 505 in accordance with the access order determined by the access order determination means 504. The clock signal A 507 drives each circuit 501. The clock signal B 508 drives the access order termination means 504, external memory 505, and access means 506. In the present invention, the memory allocation is performed so that high-order addresses of memory spaces of the external memory 505 to be used in common by the circuits 501 are made to coincide as much as possible. When the high-order addresses are common, control is exercised so that the same high-order address is not transferred, thereby reducing the number of transfers and speeding up the accesses.

The input means 502 transmits to the calculation means 503 each address width, each data width of the plurality of (N) circuits 501, the high-order address width, the low-order address width, and the data width of the external memory 505, and the data width to be influenced by the one-bit write enable.

The calculation means 503 determines the memory allocation so that the number of cycles to be spent for processing the accesses from all the N circuits 501 is reduced, based on each information input by the input means 502.

The access order determination means 504 determines the optimal access order based on the access information from the N circuits 501 and the memory allocation determined by the calculation means 503.

The access means 506 accesses to the external memory 505 in accordance with the access order determined by the access order determination means 504.

The clock signal A 507 drives the N circuits 501.

The clock signal B 508 drives the access order determination means 504, external memory 505, and access means 506. Though the clock signal A 507 is input to the access order determination means 504, the access order determination means 504 uses this clock signal A 507 as the signal indicating a change of input data from each circuit 501.

In the configuration illustrated in FIG. 5, connections between the respective N circuits 501 and the access means 506 are illustrated by way of an example. The present invention is not of course limited to such a configuration. Connections by using handshaking or the like, for example, are possible. Further, the present invention may be also applied to a configuration in which each circuit 501 and the access means 506 are connected by an arbitrary approach.

As described above, the input means 502 transmits to the calculation means the address width and the data width of each circuit 501 and the high-order address width, low-order address width, and data width of the external memory 505. When the calculation means 503 is a hardware circuit, the input means 502 may also be implemented as a terminal of the calculation means 503. Alternatively, a storage element capable of being controlled by a processor such as a CPU may be prepared for, and the address width and the data width of each circuit 501 may be transmitted to the calculation means 503 through the storage element.

As described above, the calculation means 503 calculates such the memory allocation that minimizes the number of times of accesses based on the address width and the data width of each circuit 501 and the address width and the data width of the external memory 505 obtained from the input means 502. The information to be received, for example, may be that the address width of 10 bits and the data width of 32 bits of the circuit 1, . . . , the address width of 11 bits and the data width of 10 bits of the circuit N, the high-order address width of 13 bits, low-order address width of 10 bits, and data width of 64 bits of the external memory 505, and so on.

The access order determination means 504 determines the access order with the optimal memory allocation calculated by the calculation means 503 and the access status of each of the N circuits 501 used as inputs. Then, the access order determination means 504 controls the access means 506.

An output of the access order determination means 504, for example, controls the access means 506 so that the access means 506 performs processing in the order starting from the circuit 3, circuit N-3, circuit N-2, circuit 2, . . . , to circuit 1.

The access order determination means 504 does not perform processing on the circuit from which no access is made, or whose enable signal is not active.

The access means 506 actually accesses to the external memory 505 according to the order determined by the access order determination means 504.

When the access order determination means 504 performs outputting so that processing is performed in the order starting from the circuit 3, circuit N-3, circuit N-2, circuit 2, . . . , to circuit 1, for example, the access means 506 access to the external memory 505 based of the access of the circuit 3. Next, the access means 506 accesses to the external memory 505 based on the access of the circuit N-3. Then, the access means 506 sequentially processes the access of the circuit N-2, and then processes the access of the circuit 2, and finally processes the access of the circuit 1 to the external memory 505.

Next, referring to FIG. 6, an overall operation of this exemplary embodiment will be described in detail.

First, the calculation means 503 operates. The calculation means 503 determines the optimal memory allocation from the address width and the data width of each circuit 501, the high-order address width, the low-order address width, and the data width of the external memory 505, and the data width to be influenced by the one-bit write enable which have been input (in step S1 in FIG. 6). It is noted, however, that the calculation means 503 does not operate in other steps than this step S1, and always continue outputting the same information on the memory allocation.

Figure 6:
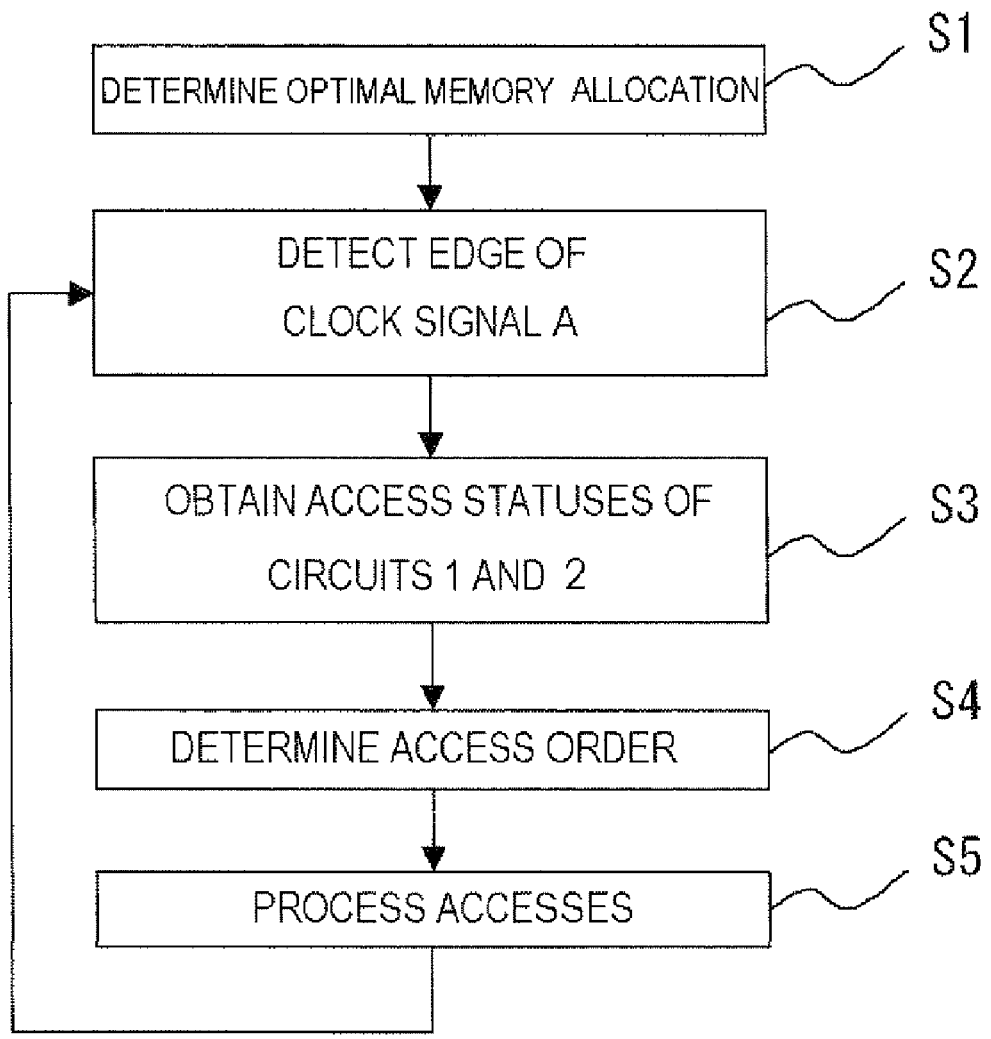
FIG. 6 is a flow diagram for explaining overall processing of the exemplary embodiment of the present invention.

Next, the access order determination means 504 waits for detection of an edge of the clock signal A 507 (in step S2 in FIG. 6).

After the access order determination means 504 has detected the edge of the clock signal A 507, the access order determination means 504 obtains an access status of each circuit 501 (in step S3 in FIG. 6).

The access order determination means 504 obtains information such as a write access from the circuit 1 and a read access from the circuit 2, based on the enable signal and a write enable signal of each circuit 501, for example.

Next, based on the access status of each circuit 501 obtained in step S3 and the memory allocation information calculated in step S1, the access order determination means 504 determines such the access order that minimizes an average access time (in step S4 in FIG. 6).

Next, the access means 506 accesses to the external memory in accordance with the access order calculated in step S4 (in step S5).

Next, a more detailed description will be given about each step described above.

First, processing of the calculation means 503 in step S1 in FIG. 6 will be described in detail. FIG. 7 is a flow diagram explaining the processing of the calculation means 503. The calculation means 503 calculates the memory allocation that minimizes the number of cycles necessary for the accesses.

First, the data width of each circuit 501 is modified so that the data width becomes a multiple of a data bit width to be influenced by the one-bit write enable for the external memory 505 (in step S11 in FIG. 7).

That is, when the data width of the circuit 501 is indicated by X and the data bit width to be influenced by the one-bit write enable for the external memory 505 is indicated by Y, the following expression (1) is calculated:

$$\left\lceil \frac{X}{Y} \right\rceil * Y \quad (1)$$

In the expression (1), a value obtained by multiplying an integer portion of a value of X divided by Y (with a decimal portion thereof rounded up) by Y is determined. For example, when the data bit width to be influenced by the one-bit write enable for the external memory 505 is eight bits (in other words Y=8), and when the data width of the circuit 1 is 26 bits, the value obtained by dividing 26 by eight is 3.25. When 3.25 is rounded up, an integer of four is obtained. Then, the data width of the circuit 1 is modified to 4×8=32 bits. When the data width of the circuit 2 is 16 bits, the value obtained by dividing 16 by eight is two. Then, the data width of the circuit 2 is modified to 2×8=16 bits. The modification as described above is made so that each access may be processed individually.

Next, using the modified data width, an address space to be used by each circuit 505 in the external memory 505 is determined (in step S12 in FIG. 7).

A description will be given below, in connection with a specific example.

It is assumed that two of the circuits 501, which are the circuits 1 and 2, for example, share one external memory 505.

Then, it is assumed that the modified data width of the circuit 1 is 32 bits, and the address space to be used by the circuit 1 is 0x400, the modified data width of the circuit 2 is 32 bits, and the address space to be used by the circuit 2 is 0x800, the data width of the external memory is 64 bits, the data bit width to be influenced by the one-bit write enable for the external memory 505 is 32 bits, the high-order address width is one bit, and the low-address width is 10 bits. Incidentally, 0x400 indicates a hexadecimal representation.

In this case, the high-order address is obtained by dividing the sum of bits to be used by all the circuits by the number of bits capable of being controlled by the low-order address and rounding the result of division to an integer. In this case, the numerical value of the high-order address to be used is obtained by the following expression (2):

$$\left\lceil \frac{32 \times 1024 + 32 \times 2048}{64 \times 1024} \right\rceil = 2 \quad (2)$$

where 1024 is a decimal representation of 0x400, while 2048 is a decimal representation of 0x800.

Next, the data width of a memory space to be used by each circuit is divided by the data bit width to be influenced by the one-bit write enable for the external memory 505, and the address of the memory space to be used by each circuit is divided by the low-order address.

The memory space to be used by the circuit 2, for example, is divided into a high-order space and a low-order space (in step S13 in FIG. 7).

Next, all possible memory allocation patterns are exhaustively enumerated (in step S14). In the case of this example, 24 patterns as shown in FIGS. 8A to 8X are enumerated.

Next, a pattern which clearly has the same average number of cycles for accesses is deleted from the enumerated patterns (in step S15 in FIG. 7).

It means that a pattern where horizontal allocation is just exchanged and a pattern where high-order address allocation is exchanged are deleted because they have the same average number of cycles for accesses.

Figure 9A:
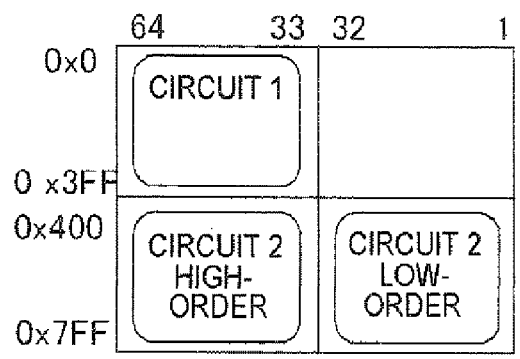
FIGS. 9A to 9C respectively show patterns 1 through 3 which have not been deleted among the patterns in FIGS. 8A through 8X.
Figure 9B:
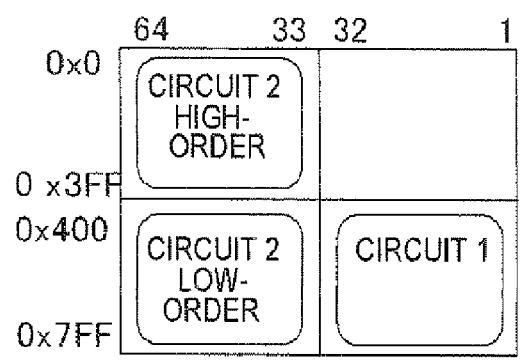
Figure 9C:
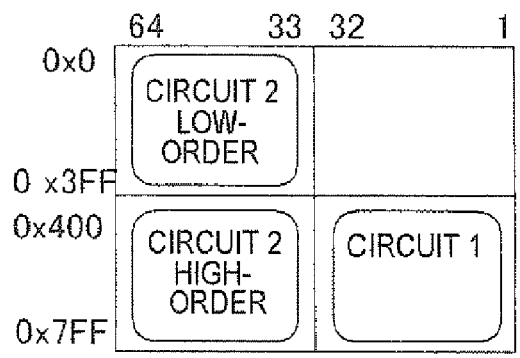

As a result, patterns 1, 2, and 3 shown in FIGS. 9A through 9C are obtained.

Further, a pattern clearly with the same average number of cycles for accesses when the access probability of each circuit is assumed to be the same is deleted.

In the case of this example, the pattern 2 in FIG. 9B has the same average number of cycles for accesses as the pattern 3 in FIG. 9C. Thus, the pattern 3 is deleted (in step S15 in FIG. 7).

Next, the average number of cycles for accesses of each pattern that has been obtained is calculated (in step S16 in FIG. 7). Then, the pattern with the minimum average access cycles among all the patterns is determined (in step S17 in FIG. 7).

The average number of cycles for accesses is the number of cycles for accesses when it is assumed that the access order determination means 504 processes accesses to the common high-order address first and processing is performed, starting from an access to a higher-order address.

Figure 10:
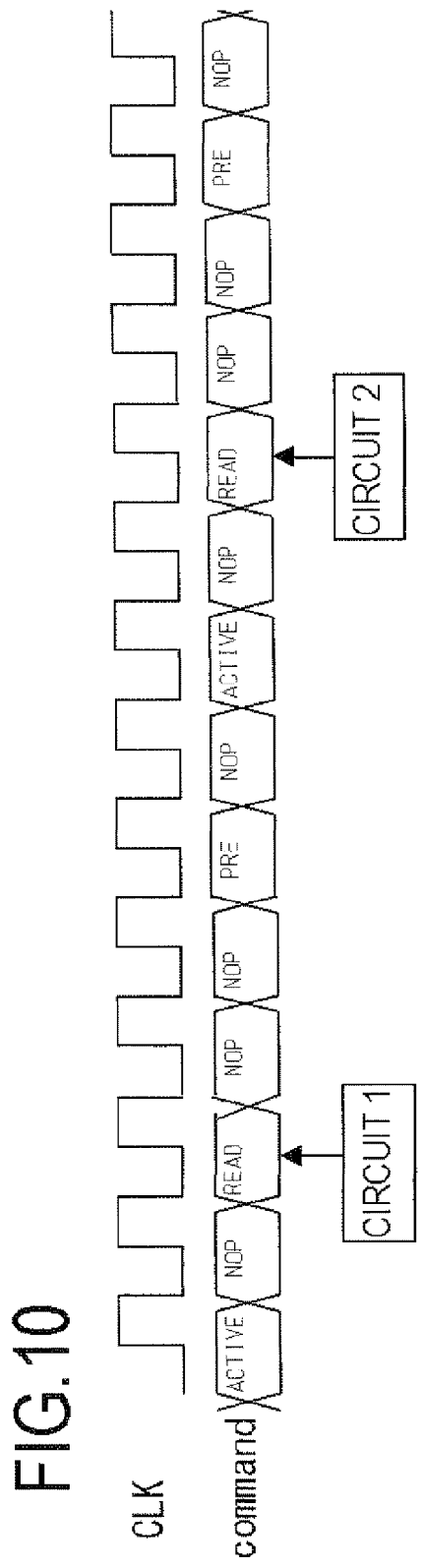
FIG. 10 is a diagram showing an example of a waveform when memory for each circuit is allocated according to the pattern 1 in FIG. 9A.

Accordingly, the number of cycles necessary for processing accesses from the circuits 1 and 2 in the case of the pattern 1 can be calculated to be 14 cycles from a waveform shown in FIG. 10.

Figure 11:
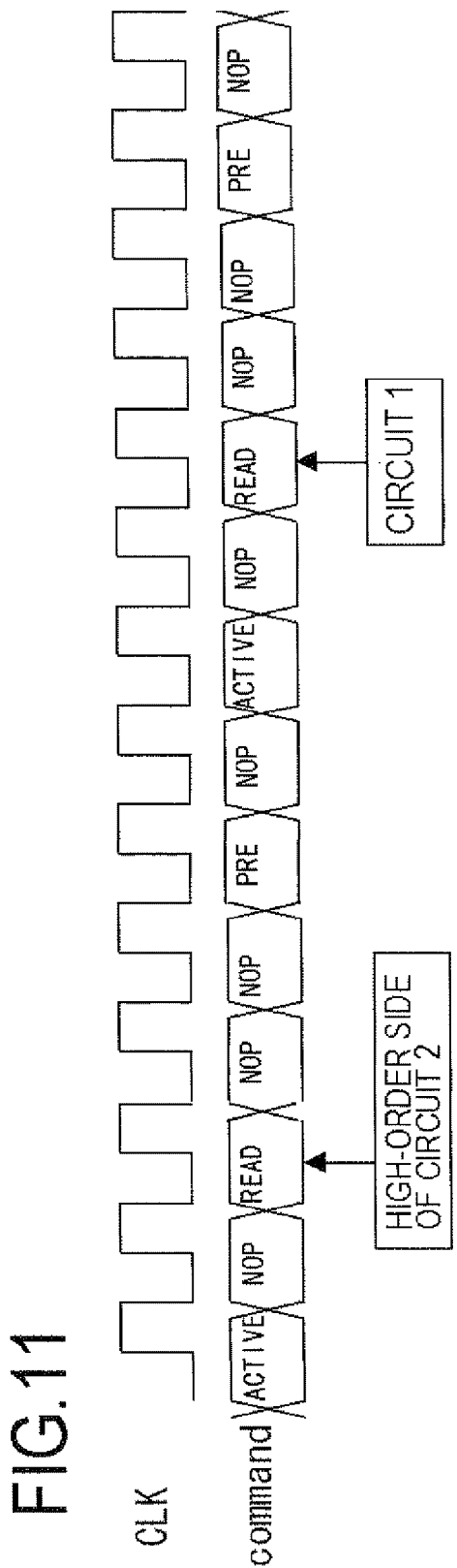
FIG. 11 is a diagram showing an example of a waveform when memory for each circuit is allocated according to the pattern 2 in FIG. 9B and an access is occurred to a high-order side of a circuit 2 in the memory.
Figure 12:
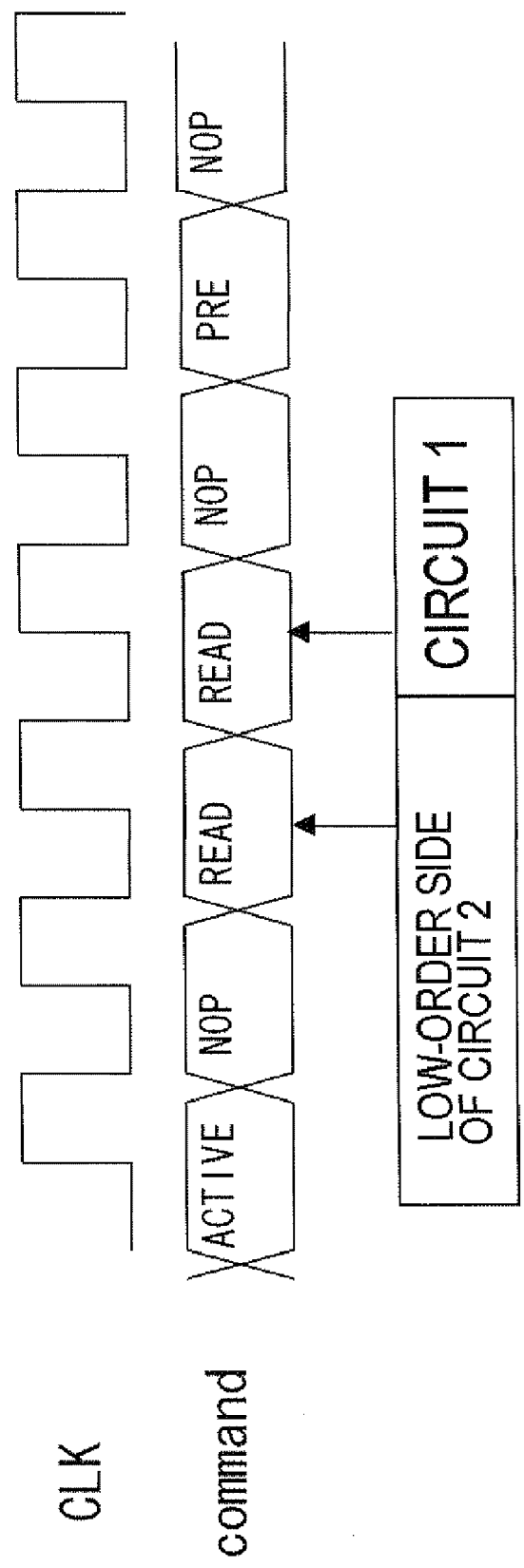
FIG. 12 is a diagram showing an example of a waveform when the memory for each circuit is allocated according to the pattern 2 in FIG. 9B and an access is occurred to a low-order side of the circuit 2 in the memory.

Likewise, in the case of the pattern 2 where an access is occurred to a high-order side of the circuit 2 allocated in the memory, a waveform shown in FIG. 11 is obtained. In the pattern where an access is occurred to a low-order side of the circuit 2 allocated in the memory, a waveform shown in FIG. 12 is obtained. Probabilities of occurrence of these patterns are ½, respectively. Thus, the average number of cycles for accesses becomes 11.

The waveforms in FIGS. 10 through 12 show the waveforms in the case of an SDRAM. When high-order addresses are common, the high-order addresses are not needed to be transferred except in the case of a first access. It means that an ACTIVE command and a PRECHARGE command can be deleted. Thus, accesses can be sped up.

Next, step S3 in FIG. 6, or an operation of the access order determination means 504 will be described in more detail.

Figure 13:
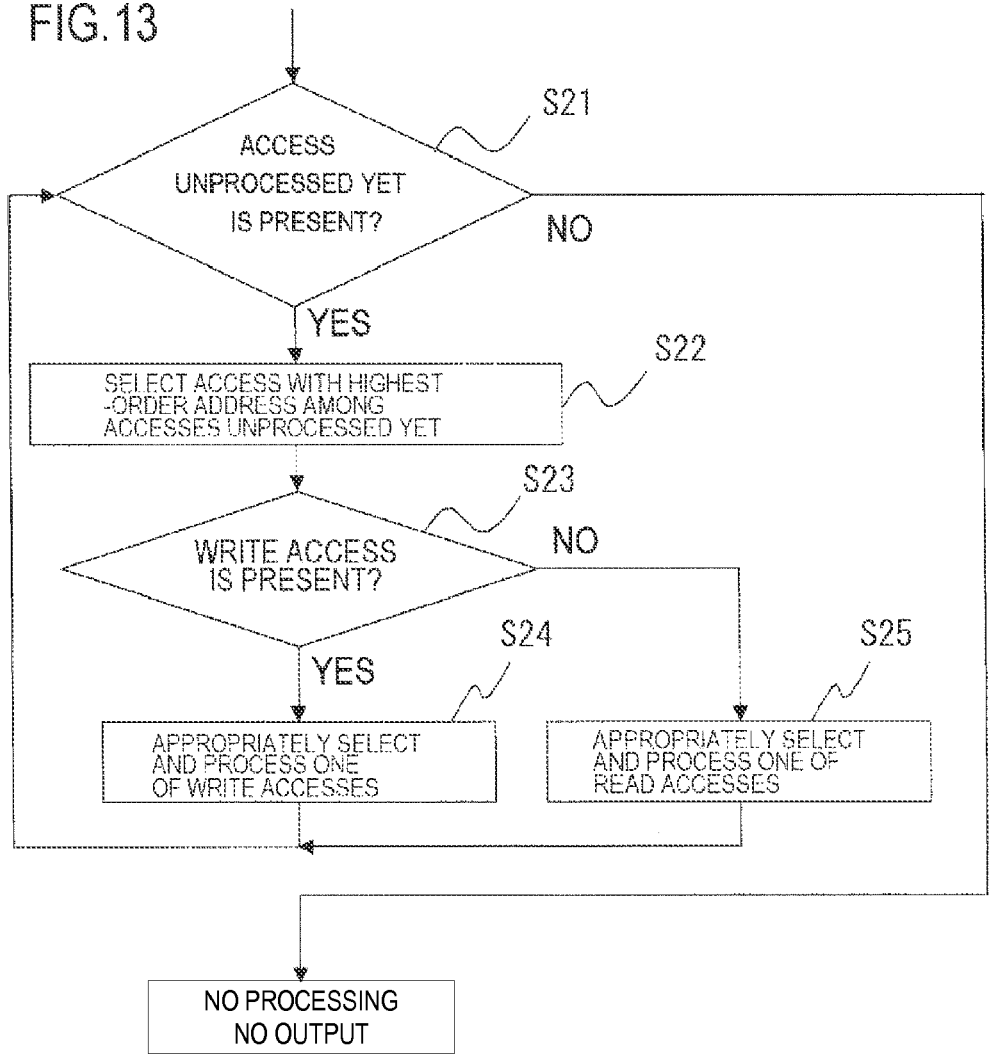
FIG. 13 is a flow diagram for explaining processing of access order determination means in the exemplary embodiment of the present invention.

FIG. 13 is a flow diagram for explaining a processing operation of the access order determination means 504.

After detecting the edge of the clock signal A 507, the access order determination means 504 checks whether each of the circuits 501 accesses or not, based on the enable and the write enable for each circuit 501 (in step S21 in FIG. 13). When there is no access at this point, the access order determination means 504 does not output anything, so that the access means 506 performs no processing.

When there are accesses that have not been processed yet in step S21 in FIG. 13, accesses with a highest-order address are selected from among the accesses (in step S22 in FIG. 13).

Next, in step S23 in FIG. 13, write accesses are selected from among the accesses selected in step S22 in FIG. 13. When there are the write accesses, a write access is appropriately selected from among the write accesses, and write processing is performed (in step S24). When there are the write accesses that have the same low-order address among the write accesses selected in step S23, the write accesses that have the same high-order address are also concurrently processed.

When it is found in step S23 in FIG. 13 that there is no write access, an appropriate read access is selected from among read accesses (in step S25). However, when there are read accesses that have the same high-order address in step S25 as well, as in the case of the write accesses, the read accesses that have the same high-order address are also concurrently processed.

The operation is returned to step S21 again, and then it is determined whether there is an access that has not been processed yet. When there is the access that has not been processed yet, processing in steps S22 through S25 is repeated. In other words, the processing in steps S22 through S25 is performed until no processed access is left.

The access means 506 actually accesses to the external memory 505 according to the order calculated by the access order determination means 504.

Next, an operation and effect of this exemplary embodiment will be described.

In this exemplary embodiment, the calculation means 503 and the access order determination means 504 perform memory allocation and determine the access order so as to reduce the average number of cycles for accesses. Thus, an access time can be shortened more than in a conventional approach.

Further, the external memory 505 can be utilized efficiently.

Figure 14:
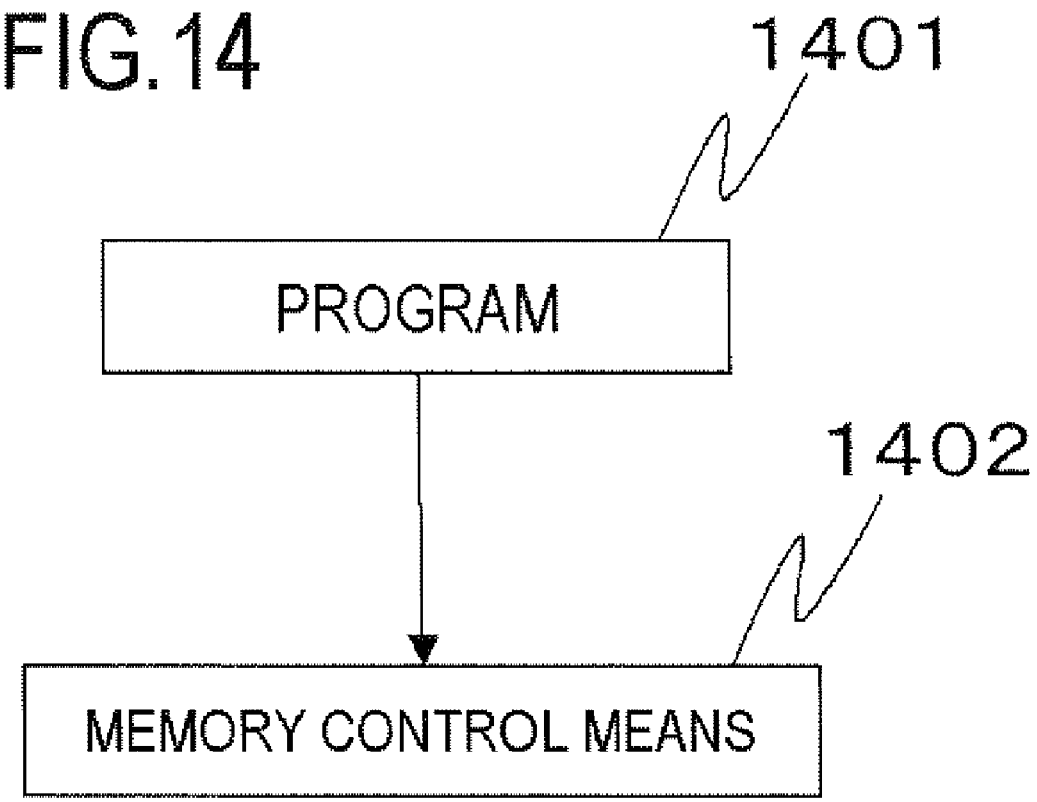
FIG. 14 is a diagram showing a configuration of a second exemplary embodiment of the present invention.

Next, a second exemplary embodiment of the present invention will be described in detail with reference to drawings. FIG. 14 is a diagram showing a configuration of the second exemplary embodiment of the present invention. Referring to FIG. 14, the second exemplary embodiment of the present invention is not changed from the exemplary embodiment described above except that memory control means 1402 is configured by using a program 1401 to be executed by a CPU and the memory control means 1402 controls the external memory 505.

Figure 15:
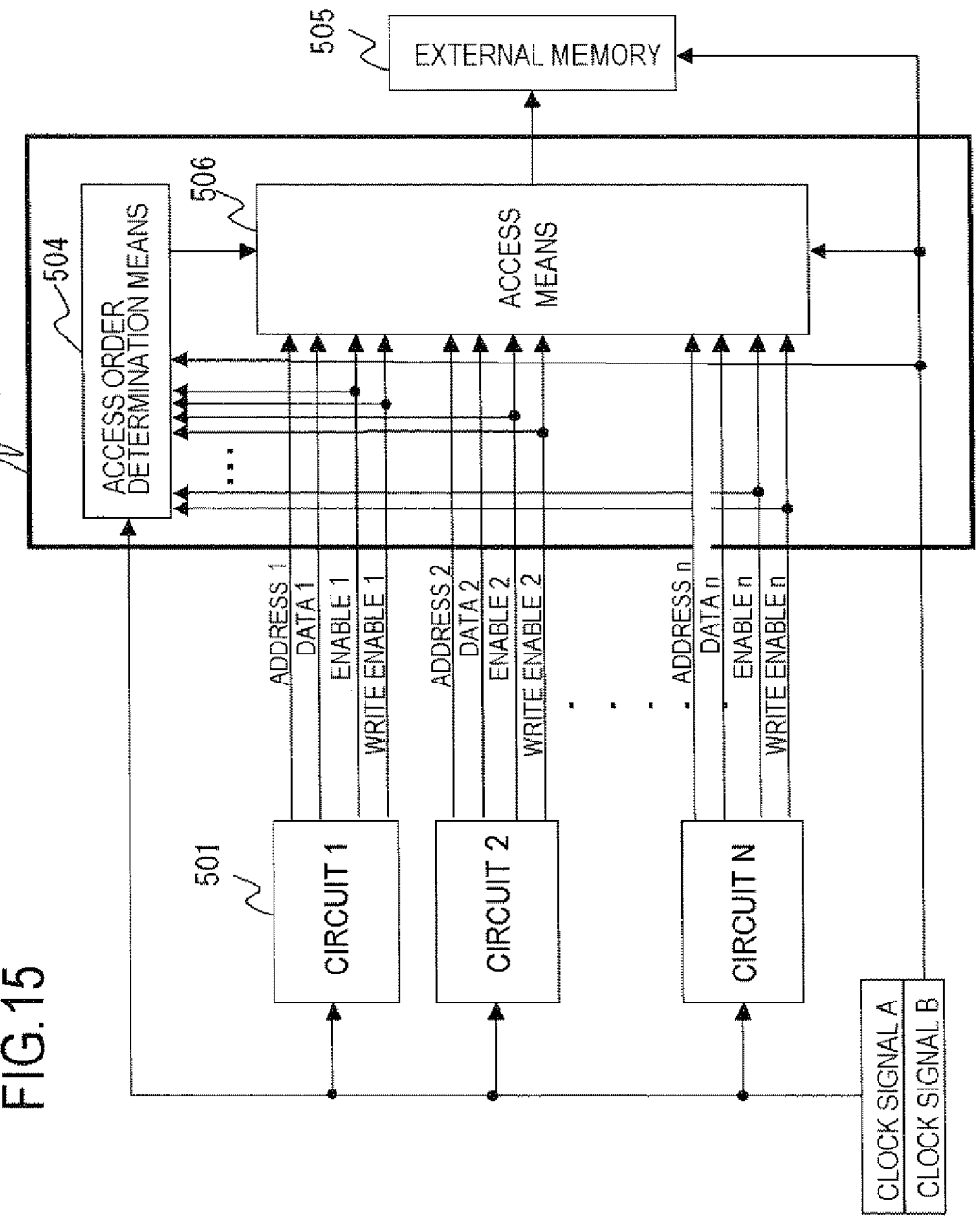
FIG. 15 is a diagram showing a configuration of memory control means in the second exemplary embodiment of the present invention.

As shown in FIG. 15, the generated memory control means 1402 implements processing functions of the access order determination means 504 and the access means 506, as in the exemplary embodiment described above.

The program 1401 implements the same method as with the calculation means 503 (refer to FIG. 5) described in the exemplary embodiment described above by software (a computer program), using the data width and the address width of each circuit, the data width, the high-order address width, and the low-order address width of the external memory 505, and the data width to be influenced by the one-bit write enable. The calculation means (not shown in FIG. 15) determines optimal memory allocation. Then, the access order determination means 504 and the access means 506, optimized by the determined memory allocation, are configured.

An operation and effect of the second exemplary embodiment of the present invention will be described.

The second exemplary embodiment of the present invention is configured to determine the optimal memory allocation by the software. Thus, there is no need for implementing the calculation means 503 in FIG. 5 by hardware. The configuration can be thereby simplified. A description will be given below using a specific example.

EXAMPLE

Referring to FIG. 16, a case where the respective means in the exemplary embodiment of the present invention are all implemented by circuits is shown. In the present example, the input means 502 are implemented as terminals of the calculation circuit 503. In other words, information on an address width of 10 bits of the circuit 1, a data width of 32 bits of the circuit 1, a high-order address width of 13 bits of the SDRAM, a low-order address width of 10 bits of the SDRAM, a data width of 64 bits of the SDRAM, and a data width to be influenced by the one-bit write enable and the like is directly input to the calculation circuit 503 as input signals. The external memory 505 is constituted from an SDRAM module.

Examples of numerical values of the address widths and the data widths and the like, shown in FIG. 16, are used simply as examples, and detailed examples of calculation will be omitted. An operation of the present example will be described below.

The calculation circuit 503 determines the [pattern 2] in FIG. 9 as the optimal memory allocation, as described in the exemplary embodiment.

Next, the access order determination circuit 504 determines an access order according to the flow diagram shown in FIG. 13.

In this case, access patterns from the circuit 1 and the circuit 2 can be considered six patterns of patterns (1) to (6), as shown in FIG. 17.

According to FIG. 13, states of accesses according to the patterns (1) through (6) in FIG. 17, for example, become those as shown in FIGS. 18C through 18H, in which according to the pattern (1), no access is made.

Therefore, if occurrence probabilities of the respective patterns are equal, the average number of cycles when allocation is made as in the pattern 1 in FIG. 9 is 9.33. When allocation is made as in the pattern 2 in FIG. 9, the average number of cycles becomes eight.

It can be seen that, by optimally mapping the memory space to be used by each circuit as described above by the calculation circuit 503, the average number of cycles can be reduced.

The present invention can be applied to a configuration in which a memory is shared by a plurality of circuits for use. In this memory, one data can be accessed by issuing address a plurality of times. When an access is occurred to one of addresses issued the plurality of times, which is the same as that in a preceding time, transfer of the same address can be omitted.

Though the present invention was described in connection with the embodiment mentioned above, the present invention is not limited to the configuration of the embodiment mentioned above alone. The invention of course includes various variations and modifications that could be made by those skilled in the art within the scope of the present invention.

The invention claimed is:

1. A storage region allocation system comprising:
   one or more access generation means, said one or more access generation means generating at least two types of accesses in total;
   access means that processes an access from said one or more access generation means;
   storage means connected to said access means and that communicates at least two address specifying informations to specify one address, wherein communication of an address specifying information is omitted when the address specifying information is equal to an address specifying information communicated at a preceding time; and
   calculation means that selects an occupation region in said storage means to be used by said one or more access generation means so as to minimize an average number of accesses to said storage means based on i) an address width and a data width of a communication path between said one or more access generation means and said access means, ii) a width of said address specifying information of said storage means, and iii) a data width of said storage means,
   wherein said calculation means is configured to i) enumerate a plurality of allocation patterns upon allocation of an occupation region arrangement in said storage means to be used by said one or more access generation means, ii) calculate an average number of accesses for each of said enumerated allocation patterns, and iii) select a pattern from said enumerated allocation patterns, having a minimum average number of accesses among the average number of accesses of the enumerated allocation patterns, as the occupation region in said storage means to be used by said one or more access generation means.

2. The storage region allocation system according to claim 1, wherein
   said calculation means receives a second data width that is influenced by a one-bit write enable; and
   dividing a data width of said one or more access generation means by said second data width, rounding up the quotient to an integer, multiplying the integer by said second data width, and using the resulting value as a data width of said one or more access generation means, said calculation means selects the occupation region in said storage means.

3. The storage region allocation system according to claim 2, wherein
   said calculation means selects an occupation region of said one or more access generation means in said storage means, using a region obtained by dividing the occupation region to be occupied by said one or more access generation means by one of said address specifying information among said address specifying information and said second data width.

4. A control apparatus comprising:
   the storage region allocation system according to claim 2;
   input means that transmits to said calculation means an address width and a data width of a communication path between said one or more access generation means and said access means, a width of said address specifying information of said storage means and a data width of said storage means, and a data width that is influenced by the one-bit write enable; and
   access order determination means that determines an access order so as to minimize an average number of accesses, based on an occupation region allocation determined by said calculation means and an access status of said one or more access generation means;
   said access means controlling accesses to said storage means in accordance with the access order determined by said access order determination means.

5. A control apparatus, comprising:
   the storage region allocation system according to claim 1;
   input means that transmits to said calculation means an address width and a data width of a communication path between said one or more access generation means and said access means, and a width of the address specifying information of said storage means and a data width of said storage means; and
   access order determination means that determines an access order so as to minimize the average number of accesses, based on an occupation region allocation determined by said calculation means and an access status of said one or more access generation means,
   said access means controlling said storage means in accordance with the access order determined by said access order determination means.

6. The control apparatus according to claim 5, wherein
   said storage means is a clock synchronous type dynamic random access memory; and
   when an access occurs to a memory space arranged at a same row address more than once and is carried out by said one or more access generation means, said access order determination means sequentially issues an active command one time, a read command/write command a plurality of times, and a precharge command one time to process the access.

7. The control apparatus according to claim 5, wherein
   when an access occurs to memory arranged at a same row address more than once and is carried out by said one or more access generation means, said access order determination means controls so that one of write processing and read processing is brought together and is processed earlier, and then a remainder of the processing is performed.

8. A storage region allocation method of allocating an occupation region in a storage means with one or more access generation means generating at least two types of accesses in total, said storage means being connected to an access means that processes an access from said one or more access generation means, and that communicates at least two address specifying informations to specify one address in said storage means, communication of an address specifying information being omitted when the address specifying information is equal to address specifying information communicated at a preceding time, said method comprising:

(a) a step of receiving an address width and a data width of a communication path between said one or more access generation means and said access means;
(b) a step of receiving a width of the address specifying information of said storage means and a data width of said storage means; and
(c) a step of selecting an occupation region in said storage means to be used by said one or more access generation means so as to minimize an average number of accesses, using the information obtained in said step (a) and step (b),
wherein said step (c) comprises:
(c. 1) a step of enumerating a plurality of allocation patterns on an allocation of an occupation region arrangement in said storage means to be used by said one or more access generation means;
(c. 2) a step of calculating an average number of accesses for each of said allocation patterns obtained in said step (c. 1); and
(c. 3) a step of selecting the pattern with the average number of accesses being minimum among the average number of accesses of the respective allocation patterns obtained in said step (c. 2), as the occupation region in said storage means to be used by said one or more access generation means.

9. The storage region allocation method according to claim 8, wherein said step (c. 1) comprises:
(c. 1.1) a step of dividing said storage means into occupation regions to be occupied by said one or more access generation means using one of the address specifying information and the second data width; and
(c. 1.2) a step of enumerating said allocation patterns of combinations of the divided occupation regions obtained in said step (c. 1.1) and allocation of said one or more access generation means.

10. The storage region allocation method according to claim 9, wherein said step (c. 1) comprises:
(c. 1.3) a step of deleting in advance a pattern clearly having an equal average number of accesses from among said allocation patterns enumerated in step (c. 1.2); and
in said step (c. 2), calculating the average number of accesses for said remaining allocation patterns obtained by deleting a pattern that clearly has the same average number of accesses from among said allocation patterns enumerated in said step (c. 1.2).

11. A control method of controlling an access to storage means using the storage region allocation method according to claim 8, said control method comprising:
(d) a step of determining an access order based on information on an occupation region allocation of said storage means to be used by said one or more access generation means obtained in said step (c) and a status of an access from said one or more access generation means to said storage means; and
(e) a step of controlling an access to said storage means in accordance with the access order determined in said step (d).

12. The storage region allocation method according to claim 8, wherein said step (a) comprises:
(a. 1) a step of receiving a second data width that is influenced by a one-bit write enable for said storage means; and
(a. 2) a step of dividing the data width of said one or more access generation means by the second data width and rounding up a resulting value of the division to an integer, multiplying the integer by the second data width, and using a result of the multiplication as a modified data width of said one or more access generation means.

13. A control apparatus that controls accesses from a plurality of circuits to a shared memory, said apparatus comprising:
calculation means, that receives i) information on an address width and a data width of each of said circuits, and ii) information on a high-order address width, a low-order address width, a data width of said memory, and a data width that is influenced by a one-bit write enable for said memory, said calculation means further configured to determine a memory allocation to be allocated to said circuits to reduce a number of cycles required for processing the access from said circuits;
access order determination means that determines an access order for said memory based on information on accesses from said circuits and the memory allocation determined by said calculation means; and
access means that accesses to said memory in accordance with the access order determined by said access order determination means,
wherein said calculation means is configured to i) enumerate a plurality of allocation patterns upon allocation of an occupation region arrangement in said storage means to be used by access generation means, ii) calculate an average number of accesses for each of said enumerated allocation patterns, and iii) select a pattern from said enumerated allocation patterns, having a minimum average number of accesses among the average number of accesses of the enumerated allocation patterns, as the occupation region in said storage means to be used by said access generation means.

14. The control apparatus according to claim 13, wherein said circuits issue address information a plurality of times when making a read access or a write access to said memory; and
said memory is a memory in which transfer of the address information, which is the same as the address information at a preceding time, may be omitted, among the plurality of address information issued by said circuits.

15. The control apparatus according to claim 13, wherein said calculation means calculates the memory allocation for said circuits so as to minimize the number of accesses to said memory from said circuits.

16. A program stored on a non-transitory, computer-readable storage medium executable on a CPU to cause a computer, in configuration with a control apparatus to control accesses from a plurality of circuits to a sharing memory, to execute:
calculation processing of received information on i) respective address widths and respective data widths of a circuit of the plurality of circuits, and ii) information on a high-order address width, a low-order address width, a data width of said memory, and information on a data width that is influenced by a one-bit write enable for said memory, and
determining a memory allocation for said circuit so as to reduce a number of cycles required for processing an access from said circuit;
access order determination processing that determines an access order for said memory based on information on the accesses from said circuit and the memory allocation determined by said calculation processing; and
access processing that accesses said memory in accordance with the access order determined by said access order determination processing, wherein said calculation processing is configured to i) enumerate a plurality of allocation patterns upon allocation of an occupation region arrangement in said storage means to be used by access generation means, ii) calculate an average number of accesses for each of said enumerated allocation patterns, and iii) select a pattern from said enumerated allocation patterns, having a minimum average number of accesses among the average number of accesses of the enumerated allocation patterns, as the occupation region in said storage means to be used by said access generation means.

17. The program according to claim 16, wherein
said circuit issues address information a plurality of times when making a read access or a write access to said memory; and
said memory is a memory in which transfer of the address information, which is the same as the address information at a preceding time, may be omitted, among the plurality of address information issued by said circuit.

18. A storage region allocation system for a storage means that communicates at least two address specifying informations to specify one address, communication of an address specifying information being omitted where the address specifying information is equal to an address specifying information communicated at a preceding time, comprising:
one or more access generation means, said one or more access generation means generating at least two types of accesses in total;
access means, in connection with said storage means, that processes an access from said one or more access generation means; and
calculation means that selects an occupation region in said storage means to be used by said one or more access generation means so as to minimize an average number of accesses to said storage means based on i) an address width and a data width of a communication path between said one or more access generation means and said access means, ii) a width of said address specifying information of said storage means, and iii) a data width of said storage means,
wherein, when said one or more access generation means repeatedly accesses said storage means, the regions to be accessed by the one or more access generation means are allocated in regions of said storage means so that the communication of the address specifying information may be omitted, and
wherein said calculation means is configured to i) enumerate a plurality of allocation patterns upon allocation of an occupation region arrangement in said storage means to be used by said one or more access generation means, ii) calculate an average number of accesses for each of said enumerated allocation patterns, and iii) select a pattern from said enumerated allocation patterns, having a minimum average number of accesses among the average number of accesses of the enumerated allocation patterns, as the occupation region in said storage means to be used by said one or more access generation means.

19. A storage device that communicates at least two address specifying informations to specify one address, communication of an address specifying information being omitted where the address specifying information is equal to an address specifying information communicated at a preceding time, comprising:
one or more access generation means, said one or more access generation means generating at least two types of accesses in total;
access means, in connection with said storage means, that processes an access from said one or more access generation means; and
calculation means that selects an occupation region in said storage means to be used by said one or more access generation means so as to minimize an average number of accesses to said storage means based on i) an address width and a data width of a communication path between said one or more access generation means and said access means, ii) a width of said address specifying information of said storage means, and iii) a data width of said storage means,
wherein, when said one or more access generation means repeatedly access said storage means, regions to be respectively accessed by said one or more access generation means are allocated, in regions of said storage means so that the communication of the address specifying information may be omitted, and
wherein said calculation means is configured to i) enumerate a plurality of allocation patterns upon allocation of an occupation region arrangement in said storage means to be used by said one or more access generation means, ii) calculate an average number of accesses for each of said enumerated allocation patterns, and iii) select a pattern from said enumerated allocation patterns, having a minimum average number of accesses among the average number of accesses of the enumerated allocation patterns, as the occupation region in said storage means to be used by said one or more access generation means.

20. A storage region allocation method for a storage means, comprising:
(a) a step of determining an access region allocation for access generation means, said storage means being connected to access means for processing an access from said access generation means, at least two address specifying information being communicated so as to specify one address in said storage means, said storage means being configured so that communication of an address specifying information is omitted when the address specifying information is equal to address specifying information communicated at a preceding time;
(b) a step of receiving an address width and a data width of a communication path between said access generation means and said access means;
(c) a step of receiving a width of the address specifying information of said storage means and a data width of said storage means; and
(d) a step of selecting an occupation region in said storage means to be used by said access generation means so as to minimize an average number of accesses, using the information obtained in said step (b) and step (c),
wherein said step (d) comprises:
(d. 1) a step of enumerating a plurality of allocation patterns on allocation of an occupation region arrangement in said storage means to be used by said access generation means;
(d. 2) a step of calculating an average number of accesses for each of said allocation patterns obtained in said step (c. 1); and
(d. 3) a step of selecting an allocation pattern with the average number of accesses being minimum among the average number of accesses of the respective allocation patterns obtained in said step (c. 2), as the occupation region in said storage means used by said access generation means,
wherein, when said access generation means repeatedly accesses said storage means in accordance with accesses from a plurality of different access generation means, regions that are respectively accessed by said plurality of access generation means are allocated in regions of said storage means so that the communication of the address specifying information may be omitted.

21. A storage region allocation system comprising:
one or more access generation means, said one or more access generation means generating at least two types of accesses in total;
access means that processes an access from said one or more access generation means;
storage means connected to said access means and that communicates at least two address specifying informations to specify one address, wherein communication of an address specifying information is omitted where the address specifying information is equal to an address specifying information communicated at a preceding time; and
calculation means that selects an occupation region in said storage means to be used by said one or more access generation means so as to minimize an average number of accesses to said storage means based on i) an address width and a data width of a communication path between said one or more access generation means and said access means, ii) a width of said address specifying information of said storage means, and iii) a data width of said storage means,
wherein
said calculation means exhaustively enumerates allocation patterns of occupation regions of said one or more access generation means in said storage means; and
said calculation means calculates the average number of accesses for each of said enumerated allocation patterns, and selects the occupation region in said storage means with the average number of accesses being a minimum among the average number of accesses.

22. A storage region allocation system comprising:
one or more access generation means, said one or more access generation means generating at least two types of accesses in total;
access means that processes an access from said one or more access generation means;
storage means connected to said access means and that communicates at least two address specifying informations to specify one address, wherein communication of an address specifying information is omitted where the address specifying information is equal to an address specifying information communicated at a preceding time; and
calculation means that selects an occupation region in said storage means to be used by said one or more access generation means so as to minimize an average number of accesses to said storage means based on i) an address width and a data width of a communication path between said one or more access generation means and said access means, ii) a width of said address specifying information of said storage means, and iii) a data width of said storage means,
wherein
said calculation means receives a second data width that is influenced by a one-bit write enable; and
dividing a data width of said one or more access generation means by said second data width, rounding up the quotient to an integer, multiplying the integer by said second data width, and using the resulting value as a data width of said one or more access generation means, wherein said calculation means selects the occupation region in said storage means.

23. A storage region allocation method of allocating an occupation region in a storage means with one or more access generation means generating at least two types of accesses in total, said storage means being connected to an access means that processes an access from said one or more access generation means, and that communicates at least two address specifying informations to specify one address in said storage means, communication of an address specifying information being omitted where the address specifying information is equal to address specifying information communicated at a preceding time, said method comprising:
(a) a step of receiving an address width and a data width of a communication path between said one or more access generation means and said access means;
(b) a step of receiving a width of the address specifying information of said storage means and a data width of said storage means; and
(c) a step of selecting an occupation region in said storage means to be used by said one or more access generation means so as to minimize an average number of accesses, using the information obtained in said step (a) and step (b),
wherein said step (a) comprises:
(a.1) a step of receiving a second data width that is influenced by a one-bit write enable for said storage means; and
(a.2) a step of dividing the data width of said one or more access generation means by the second data width and rounding up a resulting value of the division to an integer, multiplying the integer by the second data width, and using the result of the multiplication as a modified data width of said one or more access generation means.

* * * * *